United States Patent
Wang et al.

(10) Patent No.: US 10,682,682 B2
(45) Date of Patent: Jun. 16, 2020

(54) DEVICE FOR PERFORMING STRENGTHENING TREATMENT ON TOOTH ROOT OF GEAR

(71) Applicants: Gang Wang, Beijing (CN); Zhiguo Xing, Beijing (CN); Haidou Wang, Beijing (CN)

(72) Inventors: Gang Wang, Beijing (CN); Zhiguo Xing, Beijing (CN); Haidou Wang, Beijing (CN)

( * ) Notice: Subject to any disclaimer, the term of this patent is extended or adjusted under 35 U.S.C. 154(b) by 303 days.

(21) Appl. No.: 15/730,957

(22) Filed: Oct. 12, 2017

(65) Prior Publication Data

US 2018/0099327 A1    Apr. 12, 2018

(30) Foreign Application Priority Data

Oct. 12, 2016  (CN) .......................... 2016 1 0890673
Oct. 12, 2016  (CN) .......................... 2016 1 0891581
Oct. 12, 2016  (CN) .......................... 2016 1 0891641

(51) Int. Cl.
  *B21D 43/04*    (2006.01)
  *B21D 22/02*    (2006.01)
  (Continued)

(52) U.S. Cl.
  CPC ............. *B21D 43/04* (2013.01); *B21D 22/02* (2013.01); *B21D 43/003* (2013.01); *C21D 7/04* (2013.01);
  (Continued)

(58) Field of Classification Search
  CPC ........ G01N 3/317; B21D 26/06; B21D 26/14; B21D 31/06; B21D 53/28; B21D 43/04;
  (Continued)

(56) References Cited

U.S. PATENT DOCUMENTS

| | | | | | |
|---|---|---|---|---|---|
| 2,620,549 | A | * | 12/1952 | Klomp | ...................... B23F 5/20 407/20 |
| 4,450,707 | A | * | 5/1984 | Ricard | ...................... C21D 7/04 72/389.6 |
| 2015/0114074 | A1 | * | 4/2015 | Guo | ...................... B24B 39/006 72/372 |

FOREIGN PATENT DOCUMENTS

CN       2625070       7/2004
CN       101817056    9/2010
(Continued)

OTHER PUBLICATIONS

Machine Translation of CN-102967511-A from Espacenet, Yu Haiping et al., Patent Publication Year 2013, Total 9 Pages (Year: 2019).*

(Continued)

*Primary Examiner* — Teresa M Ekiert
*Assistant Examiner* — Sarkis A Aktavoukian
(74) *Attorney, Agent, or Firm* — Parker Highlander PLLC

(57) ABSTRACT

A device for performing strengthening treatment on a tooth root of a gear, a punch driver, a tooth root strengthening treatment device and a punch moving device are provided according to the present application. The device for performing the strengthening treatment on the tooth root of the gear according to the present application can impact a tooth root of a gear to be processed continuously under the action of the punch driver, and has a high efficiency while having a stable effect. The device in the present application is not limited by a complicated geometrical shape and a narrow space of the tooth root. Thus, it may be known that the devices according to the present application can address the issue of a low efficiency and poor effect in a current shot peening technique during performing the strengthening treatment on the tooth root.

8 Claims, 2 Drawing Sheets

(51) Int. Cl.
*B21D 43/00* (2006.01)
*C21D 7/04* (2006.01)
*F16H 57/00* (2012.01)
*B21D 3/16* (2006.01)
*C21D 9/32* (2006.01)

(52) U.S. Cl.
CPC ............... *B21D 3/16* (2013.01); *C21D 9/32* (2013.01); *F16H 57/00* (2013.01); *F16H 2057/0062* (2013.01)

(58) Field of Classification Search
CPC .......... B21D 43/003; C21D 7/04; C21D 7/06; B23P 9/00; B23P 9/04; B24B 39/06; B24C 1/10; B23F 23/00; B23F 5/20; B23F 23/12; B23F 23/1293; B23F 23/006; B23F 23/08–085; B25B 13/14
USPC ........................................ 409/61; 269/61, 68
See application file for complete search history.

(56) References Cited

FOREIGN PATENT DOCUMENTS

| | | | | | |
|---|---|---|---|---|---|
| CN | 202083601 | U | * | 12/2011 | |
| CN | 102967511 | | | 3/2013 | |
| CN | 102967511 | A | * | 3/2013 | |
| EP | 0293257 | | | 11/1988 | |
| FR | 2878330 | A1 | * | 5/2006 | .......... G01M 13/021 |
| JP | H0873930 | | | 3/1996 | |
| JP | 2006105352 | | | 4/2006 | |

OTHER PUBLICATIONS

Machine Translation of FR-2878330-A1 from Espacenet, Pascal et al., Patent Publication Year 2006, Total 7 Pages (Year: 2019).*
Machine Translation of CN-202083601-U from Espacenet, Guoqiang Liu et al., Patent Publication Year 2011, Total 4 Pages (Year: 2019).*
English translation of Office Communication issued in Chinese Patent Application No. 201610891581.1, dated Oct. 24, 2018.

* cited by examiner

DEVICE FOR PERFORMING STRENGTHENING TREATMENT ON TOOTH ROOT OF GEAR

CROSS-REFERENCE TO RELATED APPLICATIONS

The present application claims priority to the following three Chinese patents filed on Oct. 12, 2016 with the Chinese State Intellectual Property Office: (1) Chinese Patent Application No. 201610891581.1, titled "PUNCH DRIVER AND TOOTH ROOT STRENGTHENING TREATMENT DEVICE"; (2) Chinese Patent Application No. 201610890673.8, titled "PUNCH MOVING DEVICE"; and (3) Chinese Patent Application No. 201610891641.X, titled "DEVICE FOR PERFORMING STRENGTHENING TREATMENT ON TOOTH ROOT OF GEAR". The above three Chinese patents are incorporated herein by reference in their entirety.

FIELD

The present application relates to the technical field of gear strengthening treatment, and in particular to a device for performing strengthening treatment on a tooth root of a gear, a punch driver, a tooth root strengthening treatment device and a punch moving device.

BACKGROUND

In order to improve bending fatigue strength for extending bending fatigue life of a gear, it is typical at present to employ surface treatment to introduce a residual compressive stress layer into a tooth root of the gear. The residual compressive stress layer applied to a root surface may interact with tensile stress generated during the operation of the gear, and thus stress amplitude of the root surface is reduced, which may cause a position subjecting a maximum equivalent stress to move toward an interior of the gear. Finally, generation and propagation of cracks on the root surface can be suppressed.

At present, several types of gear surface strengthening techniques can add the residual compressive stress layer, and may be classified, by strengthening mechanism, into phase transformation strengthening, chemical strengthening and mechanical strengthening. Both the phase transformation strengthening and the chemical strengthening involve a complicated heat treatment process, and heat treatment may cause a large deformation and a poor surface accuracy. Moreover, the phase transformation strengthening and the chemical strengthening involve a complicated treatment process and a limited effect.

The mechanical strengthening mainly refers to shot peening strengthening. The shot peening strengthening is a most widely used gear surface strengthening technique. In the shot peening strengthening, high-speed shots are used to impact the root surface, and plastic deformation of the root surface is induced by an impact force from the shots, and in turn a residual compressive stress layer is introduced. Based on the principle of the shot peening, surface shot peening strengthening such as ultrasonic shot peening and laser shot peening has been developed. In the ultrasonic shot peening, mechanical energy is provided for the shots by an ultrasonic vibration device, and a small amount of shots are hit and rebounded repeatedly in the ultrasonic vibration device for transmitting energy of ultrasonic vibration to the root surface, and thus plastic deformation and a residual compressive stress layer are formed. In the laser shot peening, a gear surface is coated with a special coating, and part of the coating is vaporized and expanded by laser induction, and thus a large impact force is generated to impact a root surface, finally, a residual compressive stress layer is added.

In a shot peening strengthening process, an entire tooth (including an end surface, a tooth surface and a tooth root) of the gear is impacted to be strengthened. Since the tooth root has a complicated geometrical shape and a narrow space, and it is difficult to perform ultrasonic shot peening strengthening treatment at the tooth root described above, the ultrasonic shot peening is not applicable at the tooth root, and has no pertinence to tooth root strengthening and has a low efficiency. In the laser shot peening, the area of a surface to be processed per unit time is limited and a cost is high, and thus the laser shot peening is difficult to apply to industrial production. Thus, there is an issue of a poor effect and a low efficiency in use of a shot peening strengthening technique to strengthen the tooth root.

SUMMARY

In view of this, a device for performing strengthening treatment on a tooth root of a gear is provided according to the present application, which addresses the issue of poor effect and a low efficiency of the current shot peening technique during performing the strengthening treatment on the tooth root. A punch driver and a tooth root strengthening treatment device having the above punch driver are further provided according to the present application, which reduces heat generated by a coil. A punch moving device is further provided according to the present application, which achieves switching of a punch between an avoiding state and an operating state.

The following technical solutions are provided according to the present application.

A device for performing strengthening treatment on a tooth root of a gear is provided, which includes a charging and discharging control system, a punch driver, a punch, a positioner, an actuator and a base driver.

The punch driver includes a base and a coil. The coil is provided on the base and is connected to the charging and discharging control system for generating a pulsed magnetic field.

The punch is provided on the base, and may reciprocate with respect to the base. The punch is opposed to a tooth groove of a gear to be processed, and may impact a tooth root of the gear to be processed under the action of the pulsed magnetic field.

The positioner is configured to pass through an axial hole of the gear to be processed for supporting the gear to be processed. The actuator is configured to engage with the gear to be processed, for actuating the gear to be processed to allow the gear to be processed to rotate around the positioner when the punch is in an avoiding state.

The base driver is configured to drive the base to bring the punch to switch between the avoiding state and an operating state of the punch.

Preferably, in the device for performing the strengthening treatment on the tooth root of the gear described above, the punch includes a copper driving plate, an intermediate metal member and a punch body. The intermediate metal member is configured to connect the copper driving plate and the punch body, and the copper driving plate is close to the coil.

A punch driver is provided, which is configured to provide an electromagnetic force for a punch and includes a base and a coil. The coil is provided on the base, and is connected to a charging and discharging control system for generating a pulsed magnetic field. An electric wire of the coil is formed by the winding of a metal wire and a carbon nanotube.

Preferably, in the punch driver described above, the electric wire of the coil is formed by the bifilar winding of a copper wire and a carbon nanotube.

A tooth root strengthening treatment device is provided, which includes a charging and discharging control system, a punch driver, a punch, a positioner and an actuator.

The punch driver includes a base and a coil. The coil is provided on the base, and is connected to the charging and discharging control system for generating a pulsed magnetic field.

The punch is provided on the base, and may reciprocate with respect to the base. The punch is opposed to a tooth groove of a gear to be processed, and may impact a tooth root of the gear to be processed under the action of the pulsed magnetic field.

The positioner is configured to pass through an axial hole of the gear to be processed for supporting the gear to be processed. The actuator is configured to engage with the gear to be processed, for actuating the gear to be processed to allow the gear to be processed to rotate around the positioner when the punch is in an avoiding state.

Preferably, in the tooth root strengthening treatment device described above, the actuator is a rack actuator or a gear actuator, and a rack of the rack actuator or a gear of the gear actuator is engaged with the gear to be processed.

Preferably, in the tooth root strengthening treatment device described above, the rack actuator includes a rack and a track, and the rack is in sliding cooperation with the track, and the rack is movable along the track, and the track is a cross-shaped track.

A punch moving device for driving a punch to allow the punch to move between an avoiding position and an operating position includes a charging and discharging control system, a punch driver, a punch and a base driver.

The punch driver includes a base and a coil. The coil is provided on the base, and is connected to the charging and discharging control system for generating a pulsed magnetic field.

The punch is provided on the base, and may reciprocate with respect to the base. The punch is opposed to a tooth groove of a gear to be processed and may impact a tooth root of the gear to be processed under the action of the pulsed magnetic field.

The base driver is configured to drive the base to bring the punch to switch between an avoiding state and an operating state of the punch.

Preferably, in the punch moving device described above, the base driver is a screw driving mechanism.

Preferably, in the punch moving device described above, the base includes a first portion and a second portion. The second portion is hinged to the first portion, and is connected both of the coil and the punch. The second portion may drive the punch to allow the punch to swing in a circumferential direction of the gear to be processed.

Preferably, in the punch moving device described above, the punch moving device further includes a position limiter provided on the second portion. The position limiter is configured to cooperate with the punch at a tail of the punch for limiting a position of the punch.

Preferably, in the punch moving device described above, the punch moving device further includes an elastic member. The elastic member is provided between the position limiter and the punch.

During operation of the device for performing the strengthening treatment on the tooth root of the gear according to the present application, the charging and discharging control system charges the coil such that the coil is energized to generate the pulsed magnetic field, and the punch is subjected to the electromagnetic force, and may in turn reciprocate with respect to the base, and reciprocation of the punch may generate impact on the tooth root of the gear to be processed. The punch may impact the gear to be processed continuously to introduce the residual compressive stress layer into the tooth root in the operating state, thereby achieving an object of strengthening the tooth root. After a tooth root in a tooth groove to which the punch 3 corresponds in some state is strengthened, the punch retracts into the avoiding state and in this case, the punch exits from the tooth groove and the actuator is operated to cause the gear to be processed to rotate such that the next tooth groove will correspond to the punch, and thus, the punch proceeds to the next impact strengthening process, until all tooth roots of the gear to be processed are strengthened.

It may be known from an operation process described above that the device for performing the strengthening treatment on the tooth root of the gear according to the present application can impact the tooth root of the gear to be processed continuously under the action of the punch driver, and has a high efficiency while having a stable effect. The devices in the present application are not limited by a complicated geometrical shape and narrow space of the tooth root. Thus, it may be known that the devices according to the present application can address an issue of a low efficiency and a poor effect existed in current use of a shot peening technique to perform the strengthening treatment on the tooth root.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. The drawings in the following description are only examples of the present application, and for the person skilled in the art, other drawings may be obtained based on these drawings without any creative efforts.

FIG. 1 is also a top view;

DETAILED DESCRIPTION OF EMBODIMENTS

In order to make the person skilled in the art have a better understanding of a solution of the present application, the present application is described hereinafter in further detail in conjunction with the drawings.

Figure 1:
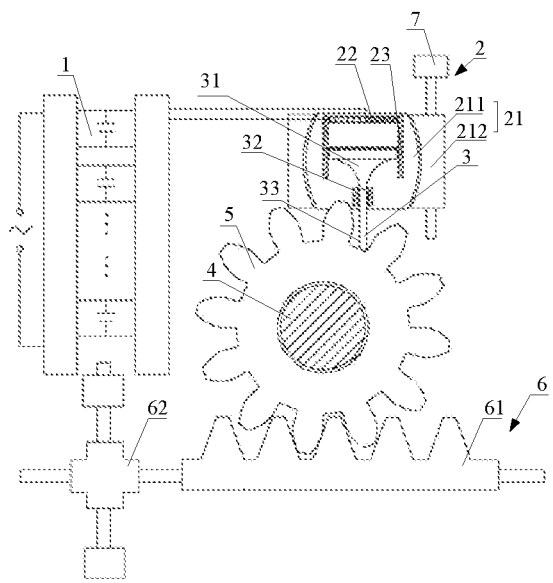
FIG. 1 is a schematic view showing the structure of a tooth root strengthening treatment device according to an embodiment of the present application.
Figure 2:
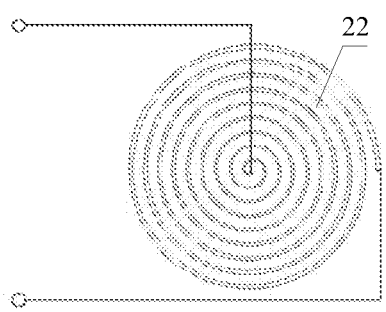
FIG. 2 is a schematic view showing the structure of a coil according to an embodiment of the present application.
Figure 3:
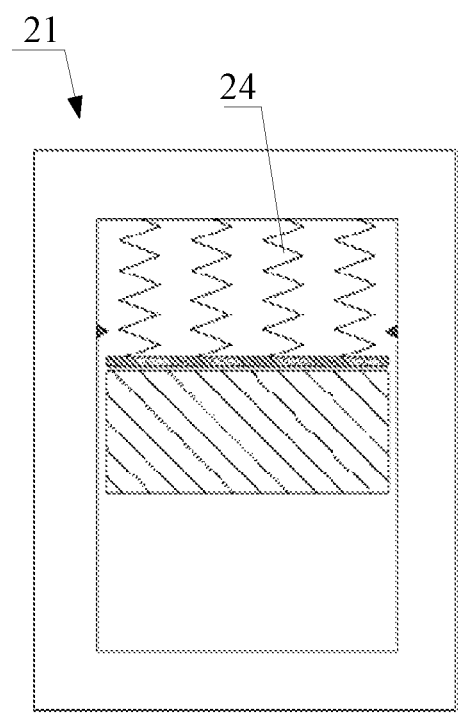
FIG. 3 is a schematic view showing the arrangement of a spring provided on a base.

Referring to FIGS. 1 to 3, a device for strengthening a tooth root of a gear is provided according to an embodiment of the present application. The provided device for strengthening the tooth root of the gear includes a charging and discharging control system 1, a punch driver 2, a punch 3, a positioner 4, an actuator and a base driver 7.

The punch driver 2 is configured to drive the punch 3 to move. The punch driver 2 includes a base 21 and a coil 22, and the coil 22 is provided on the base 21. As shown in FIG. 2, the coil 22 is typically a helical coil. In the present application, the coil 22 generates a pulsed magnetic field in a charged state, and the charging and discharging control system 1 is connected to the coil 22, and is configured to achieve charging and discharging through circuit control, which ensures to constantly generate a pulsed magnetic field with a magnitude of about 10T and a pulse length of about 20 ms in the coil 22.

The punch 3 is typically made of a high-strength material. The punch 3 is provided on the base 21, and may reciprocate with respect to the base 21, that is, the punch 3 and the base 21 form a moving pair. The punch 3 is opposed to a tooth groove of a gear 5 to be processed, and may impact a tooth root of the gear 5 to be processed under the action of the pulsed magnetic field.

The positioner is configured to pass through an axial hole of the gear 5 to be processed for supporting the gear 5 to be processed. The actuator is configured to actuate the gear 5 to be processed, and the actuator may actuate the gear 5 to be processed to allow the gear 5 to be processed to rotate around the positioner when the punch 3 is in the avoiding state. In the present application, the positioner is typically a positioning shaft, and the actuator may be a rack actuator 6 or a gear actuator. A rack of the rack actuator 6 or a gear of the gear actuator is engaged with the gear 5 to be processed. The gear 5 to be processed is driven to rotate by movement of the rack or rotation of the gear of the gear actuator, thus, it is achieved that the punch 3 is opposed to a tooth groove, different from the tooth groove in which the impacted tooth root is located, of the gear 5 to be processed, which in turn makes preparation for subsequent impact of the punch 3.

The base driver 7 is configured to drive the base 21 to bring the punch 3 to switch between an avoiding state and an operating state of the punch 3. The base driver 7 may be a screw driving mechanism. The base driver 7 typically adjusts the punch 3 indirectly to allow the punch 3 to switch between the avoiding state and the operating state, by adjusting a position of the entire base 21.

Referring to FIG. 1 and FIG. 2 again, a punch driver according to the present application is configured to provide an electromagnetic force for a punch and the punch driver includes a base 21 and a coil 22. The coil 22 is provided on the base 21, and is connected to the charging and discharging control system 1 for generating a pulsed magnetic field. An electric wire of the coil 22 is formed by the winding of a metal wire and a carbon nanotube.

Referring to FIGS. 1 to 3, a tooth root strengthening treatment device is provided according to an embodiment the present application. The provided tooth root strengthening treatment device includes a charging and discharging control system 1, a punch driver 2, a punch 3, a positioner 4 and an actuator.

The punch driver 2 is configured to drive the punch 3 to move. The punch driver 2 includes a base 21 and a coil 22, and the coil 22 is provided on the base 21. As shown in FIG. 2, the coil 22 is typically a helical coil. In the present application, the coil 22 generates a pulsed magnetic field in a charged state, and the charging and discharging control system 1 is connected to the coil 22, and is configured to achieve charging and discharging through circuit control, which ensures to constantly generate a pulsed magnetic field with a magnitude of about 10T and a pulse length of about 20 ms in the coil 22.

The punch 3 is typically made of a high-strength material. The punch 3 is provided on the base 21, and may reciprocate with respect to the base 21, that is, the punch 3 and the base 21 form a moving pair. The punch 3 is opposed to a tooth groove of a gear 5 to be processed, and may impact a tooth root of the gear 5 to be processed under the action of the pulsed magnetic field.

The positioner is configured to pass through an axial hole of the gear 5 to be processed for supporting the gear 5 to be processed. The actuator is configured to flip the gear 5 to be processed, and the actuator can flip the gear 5 to be processed to allow the gear 5 to be processed to rotate around the positioner when the punch 3 is in the avoiding state. In the present application, the positioner is typically a positioning shaft, and the actuator may be a rack actuator 6 or a gear actuator. A rack of the rack actuator 6 or a gear of the gear actuator is engaged with the gear 5 to be processed. The gear 5 to be processed is driven to rotate by movement of the rack or rotation of the gear of the gear actuator, thus, it is achieved that the punch 3 is opposed to a tooth groove, different from the tooth groove in which the impacted tooth root is located, of the gear 5 to be processed, which in turn makes preparation for subsequent impact of the punch 3.

During operation of the devices according to the embodiment of the present application, the charging and discharging control system 1 charges the coil 22 such that the coil 22 is energized to generate a pulsed magnetic field, and the punch 3 is subjected to an electromagnetic force under the action of the pulsed magnetic field to reciprocate with respect to the base 21, and in turn reciprocation of the punch 3 may impact the tooth root of the gear 5 to be processed. In the present application, the punch 3 may be in an avoiding state or in an operating state, and may impact the gear 5 to be processed continuously in the operating state to introduce a residual compressive stress layer into the tooth root, thereby achieving an object of strengthening the tooth root. After a tooth root in a tooth groove to which the punch 3 corresponds in one state is strengthened, the punch 3 retracts into the avoiding state and in this case, the punch 3 exits from the tooth groove and the actuator may cause the gear 5 to be processed to rotate such that the next tooth groove will correspond to the punch 3, and thus, the punch 3 proceeds to the next impact strengthening process, until all tooth roots of the gear 5 to be processed are strengthened. In a strengthening process, an operator may, if necessary, fit the gear 5 to be processed onto the positioner from one side, opposite to a side where the tooth root has been strengthened, thereby strengthening a tooth root close to the one side.

It may be known from an operation process described above that the device for strengthening the tooth root of the gear according to the embodiment of the present application can impact the tooth root of the gear 5 to be processed continuously under the action of the punch driver 2, which has a high efficiency a stable effect. The device in the present application is not limited by a complicated geometrical shape and a narrow space of the tooth root, thus it may be known that the device according to the embodiment of the present application can address the issue of a low efficiency and poor effect in a current shot peening technique during performing strengthening treatment on the tooth root.

Referring to FIG. 1 again, a rack actuator 6 includes a rack 61 and a track 62. The rack 61 is in sliding cooperation with the track 62, and the track 61 is movable along the track 62 to achieve adjustment of a position of the rack 61, thereby achieving an object that the rack 61 is engaged with a gear 5 to be processed. The rack 61 cooperates with the positioner such that the gear 5 to be processed is at a secured position, thereby making preparation for subsequent impact of the punch 3. Specifically, the track 62 may be a cross-shaped track, which is more convenient for adjusting the position of the rack 61.

The coil 22 generates a pulsed magnetic field under the charging and discharging control system 1. The coil 22 may be formed by the winding of different metallic and conductive materials. Preferably, the coil 22 is formed by the bifilar winding of a copper wire and a carbon nanotube. During generating of the pulsed magnetic field, a large current may be generated in the coil 22. The coil 22 generates a lot of heat and has a large repulsive force therein. The carbon nanotube has a good conductivity and strength, and generates a small amount of heat, thus the carbon nanotube can reduce the heat generated by the coil 22 while having a high strength and being capable of absorbing the repulsive force generated in the coil 22 well. However, since the material of the carbon nanotube is difficult to be prepared, the carbon nanotube is expensive. For this reason, the above coil 22 is formed by the bifilar winding of the copper wire and the carbon nanotube, which can not only improve heat dissipation performance and overall strength of the entire coil 22, but also will not make preparation cost of the entire coil 22 too high. Thus, the above coil 22 has a high cost performance.

In the present application, the punch 3 is typically a composite punch. An eddy current can be generated in the punch 3 when loading of the coil 22 changes. The eddy current causes the punch 3 to be subjected to a great electromagnetic force in the pulsed magnetic field. The electromagnetic force can drive the punch 3 to move, to achieve an object of impacting the tooth root of the gear 5 to be processed and finally to achieve the strengthening treatment.

Referring to FIG. 1 again, in an embodiment, the punch 3 may include a copper driving plate 31, an intermediate metal member 32 and a punch body 33. The intermediate metal member 32 is configured to connect the copper driving plate 31 and the punch body 33. The copper driving plate 31 is located at an end, close to the coil 22, of the punch 3. The copper driving plate 31, the intermediate metal member 32 and the punch body 33 described above may be connected together by a bolt. Since the punch body 33 is a main part of the punch 3 and is also a part of the punch 3 impacting the tooth root, the punch body 33 is required to have a great strength and has a high fatigue performance requirement. Martensitic precipitation hardening stainless steel has a high strength (it may have a yield strength up to 2.5 Gpa or more), and has excellent thermal fatigue resistance performance and excellent corrosion resistance performance. To this end, the punch body 33 may be made of martensitic precipitation hardened stainless steel.

In an embodiment of the present application, the base 21 may include a first portion 211 and a second portion 212. The second portion 212 is hinged to the first portion 211, and is connected to both the coil 22 and the punch 3. The second portion 212 can drive the punch 3 to allow the punch 3 to swing in a circumferential direction of the gear 5 to be processed, which in turn enables the punch 3 to make impact in one region of the tooth root and to perform impact strengthening treatment in a region as large as possible.

Preferably, the second portion 212 is provided with a position limiter 23. The position limiter 23 is configured to cooperate with the punch 3 at a tail of the punch 3 for limiting a position of the punch 3, and the position limiter 23 can absorb movement, when the punch 3 returns, of the punch 3. Further, the coil 22 may be arranged on the position limiter 23. More preferably, the device according to the embodiment of the present application may further includes an elastic member. The elastic member is arranged between the position limiter 23 and the punch 3, and can buffer the impact better, thereby avoiding a great impact, generated by the punch 3 when the punch 3 returns, on the position limiter 23. The elastic member may be a spring 24, or may alternatively be an elastic rubber block.

The tooth root strengthening treatment device according to the embodiment of the present application may further include a base driver 7. The base driver 7 is configured to drive the base 21 to bring the punch 3 to switch between an avoiding state and an operating state of the punch 3. The base driver 7 may be a screw driving mechanism. The base driver 7 typically adjusts the punch 3 indirectly to allow the punch 3 to switch between the avoiding state and the operating state, by adjusting a position of the entire base 21.

Referring to FIG. 1 again, a punch moving device according to the present application is configured to drive the punch to allow the punch to move between an avoiding position and an operating position, and the punch moving device includes a charging and discharging control system 1, a punch driver 2, a punch 3 and a base driver 7.

The punch driver 2 includes a base 21 and a coil 22. The coil 22 is provided on the base 21, and is connected to the charging and discharging control system 1 for generating a pulsed magnetic field.

The punch 3 is arranged on the base 21, and can reciprocate with respect to the base 21. The punch 3 is opposed to a tooth groove of a gear 5 to be processed, and can impact a tooth root of the gear 5 to be processed under the action of the pulsed magnetic field.

The base driver 7 is configured to drive the base 21 to bring the punch 3 to switch between an avoiding state and an operating state of the punch 3.

Preferably, the base driver 7 may be a screw driving mechanism. The screw driving mechanism may drive the base to allow the base to reciprocate linearly, so as to achieve switching of the punch 3 between the avoiding state and the operating state of the punch 3.

Some exemplary embodiments of the present application are described above by way of illustration only. For the ordinary person skilled in the art, modifications may be made to the described embodiments in various ways without departing from the spirit and scope of the present application. Therefore, the above drawings and description are illustrative in nature, and should not be interpreted as limitations to the scope of protection of claims of the present application.

The invention claimed is:

1. A device for performing strengthening treatment on a tooth root of a gear, comprising:
   a charging and discharging control system;
   a punch driver;
   a punch;
   a positioner;
   an actuator; and
   a base driver;
   wherein the punch driver comprises a base and a coil, and the coil is provided on the base and is connected to the charging and discharging control system for generating a pulsed magnetic field,
   the punch is provided on the base and is configured to reciprocate with respect to the base, and the punch is opposed to a tooth groove of the gear, and impact a tooth root of the gear under an action of the pulsed magnetic field,
   the positioner is configured to pass through an axial hole of the gear for supporting the gear, and the actuator is configured to engage with the gear, for actuating the gear to be processed to allow the gear to be processed to rotate around the positioner in the case that the punch is in an avoiding state, and the base driver is configured to drive the base to bring the punch to switch between the avoiding state and an operating state of the punch, wherein the actuator is a rack actuator or a gear actuator, and a rack of the rack actuator or another gear of the gear actuator is engaged with the gear, wherein the rack actuator comprises the rack and a track, and the rack is in sliding cooperation with the track, and the rack is movable along the track, and the track is a cross-shaped track.

2. The device for performing the strengthening treatment on the tooth root of the gear according to claim 1, wherein the punch comprises a copper driving plate, an intermediate metal member and a punch body, and the intermediate metal member is configured to connect the copper driving plate and the punch body, and the copper driving plate is close to the coil.

3. A tooth root strengthening treatment device, comprising:

a charging and discharging control system;
a punch driver;
a punch;
a positioner; and
an actuator;
wherein the punch driver comprises a base and a coil, and the coil is provided on the base, and is connected to the charging and discharging control system for generating a pulsed magnetic field;

the punch is provided on the base and configured to reciprocate with respect to the base, and the punch is opposed to a tooth groove of the gear, and impact a tooth root of the gear to be processed under an action of the pulsed magnetic field; and the positioner is configured to pass through an axial hole of the gear for supporting the gear; and the actuator is configured to engage with the gear, for actuating the gear to allow the gear to rotate around the positioner when the punch is in an avoiding state, wherein the actuator is a rack actuator or a gear actuator, and a rack of the rack actuator or another gear of the gear actuator is engaged with the gear, wherein the rack actuator comprises the rack and a track, and the rack is in sliding cooperation with the track, and the rack is movable along the track, and the track is a cross-shaped track.

4. A punch moving device configured to drive a punch to allow the punch to move between an avoiding position and an operating position, comprising:

a charging and discharging control system;
a punch driver;
the punch;
a base driver; and
an actuator
wherein the punch driver comprises a base and a coil, and the coil is provided on the base, and is connected to the charging and discharging control system for generating a pulsed magnetic field, the punch is provided on the base and configured to reciprocate with respect to the base, and the punch is opposed to a tooth groove of the gear and impact a tooth root of the gear under an action of the pulsed magnetic field, and the base driver is configured to drive the base to bring the punch to move between the avoiding position and the operating position of the punch, wherein the actuator is a rack actuator or a gear actuator, and a rack of the rack actuator or another gear of the gear actuator is engaged with the gear, wherein the rack actuator comprises the rack and a track, and the rack is in sliding cooperation with the track, and the rack is movable along the track, and the track is a cross-shaped track.

5. The punch moving device according to claim 4, wherein the base driver is a screw driving mechanism.

6. The punch moving device according to claim 4, wherein the base comprises a first portion and a second portion, and the second portion is hinged to the first portion, and a connecting surface of the second portion is hinged to a connecting surface of the first portion, and the second portion is rotatable with respect to the first portion, and the first portion is connected to both of the coil and the punch, and the second portion drives the punch to allow the punch to swing in a circumferential direction of the gear.

7. The punch moving device according to claim 6, further comprising:

a position limiter provided on the second portion,
wherein the position limiter limits the punch at a tail of the punch.

8. The punch moving device according to claim 7, further comprising:

an elastic member,
wherein the elastic member is provided between the position limiter and the punch.

* * * * *

UNITED STATES PATENT AND TRADEMARK OFFICE
CERTIFICATE OF CORRECTION

PATENT NO. : 10,682,682 B2
APPLICATION NO. : 15/730957
DATED : June 16, 2020
INVENTOR(S) : Gang Wang et al.

It is certified that error appears in the above-identified patent and that said Letters Patent is hereby corrected as shown below:

In the Claims

In Claim 1, Column 9, Line 2, delete "gear to be processed to allow the gear to be processed" and insert --gear to allow the gear-- therefor.

In Claim 3, Column 9, Line 36, delete "to be processed".

Signed and Sealed this
Twenty-first Day of July, 2020

Andrei Iancu
*Director of the United States Patent and Trademark Office*